US011295078B2

(12) United States Patent
Turek et al.

(10) Patent No.: US 11,295,078 B2
(45) Date of Patent: Apr. 5, 2022

(54) PORTFOLIO-BASED TEXT ANALYTICS TOOL

(71) Applicant: ROYAL BANK OF CANADA, Montreal (CA)

(72) Inventors: Tomas Turek, Toronto (CA); Yusuf Khaled, Toronto (CA)

(73) Assignee: ROYAL BANK OF CANADA, Montreal (CA)

( * ) Notice: Subject to any disclaimer, the term of this patent is extended or adjusted under 35 U.S.C. 154(b) by 315 days.

(21) Appl. No.: 16/440,951

(22) Filed: Jun. 13, 2019

(65) Prior Publication Data

US 2019/0384812 A1     Dec. 19, 2019

Related U.S. Application Data

(60) Provisional application No. 62/684,383, filed on Jun. 13, 2018.

(51) Int. Cl.
*G06F 40/216* (2020.01)
*G06F 40/284* (2020.01)
*G06F 40/30* (2020.01)

(52) U.S. Cl.
CPC .......... *G06F 40/216* (2020.01); *G06F 40/284* (2020.01); *G06F 40/30* (2020.01)

(58) Field of Classification Search
CPC ....... G06F 40/216; G06F 40/284; G06F 40/30
See application file for complete search history.

(56) References Cited

U.S. PATENT DOCUMENTS

| 7,184,948 B2* | 2/2007 | Chalabi | G06F 40/268 704/9 |
| 9,836,533 B1* | 12/2017 | Levi | G06Q 30/02 |
| 11,151,203 B2* | 10/2021 | Natchu | G06F 16/951 |
| 2006/0190241 A1* | 8/2006 | Goutte | G06F 40/45 704/2 |
| 2014/0092424 A1* | 4/2014 | Grosz | G06F 3/04845 358/1.15 |
| 2016/0225034 A1* | 8/2016 | Putrevu | G06Q 30/0277 |
| 2016/0357851 A1* | 12/2016 | Perkins | G06F 40/30 |

* cited by examiner

*Primary Examiner* — Beau D Spratt
(74) *Attorney, Agent, or Firm* — Norton Rose Fulbright Canada LLP

(57) ABSTRACT

A portfolio analytics platform can implement a crawler and natural language processor to identify relevant articles. The natural language processor can integrate a text analysis tool, domain specific latent Dirichlet allocation tool, and theme measurement tool for identifying themes relevant to a particular domain. For example, the domain specific latent Dirichlet allocation tool identifies domain specific themes and uses an iterative process for eliminating articles or themes that are not specific to the domain. The theme measurement tool uses term frequency-inverse document frequency for naming and identifying the most relevant themes. The platform can generate interactive visual elements for an interface application.

19 Claims, 21 Drawing Sheets

2

1. British FX Firm Currencies Direct Pilots Ripple Tech
2. Emerging Market Currencies Proving Gold, Not Bitcoin, Is A Hedge Against Currency Collapse
3. XRP IS A GAME CHANGER' — CURRENCIES DIRECT SUCCESSFULLY COMPLETES INTERNATIONAL PAYMENT USING RIPPLE'S XRAPID
4. Regulating digital currencies to fight crime
5. Most Asian currencies hit by sell-off over Italy; Indonesia cbank eyed
6. Currencies Rebound as Lira Bucks Trend in a Wild Ride
7. How Digital Currencies Complement Fintech
8. Bank of England: Central Bank Digital Currencies Can Jeopardize Commercial Banks
9. Gold Still 'Fantastic' As All Currencies Are Losing To U.S. Dollar - America Silver
10. Europe's Troubles Ripple Across to Polish, Czech, Swedish Currencies
11. 60 Seconds: How Do You Make Money From Currency Trading?
12. Erdoğan, Putin speak on phone, stress 'importance of using local currencies in bilateral trade'
13. Traders Look for Clues About the Emerging-Market Currency Bounce
14. Re-emergence of Monetary Policy Divergence II – High – Yield Currencies
15. Asian currencies softer as dollar gains on euro concerns
16. Which Digital Currencies Is Nasdaq Backing?
17. Alt coins rally after major crypto currencies bounce
18. Why Currency Traders Should Pay Attention to Emerging Markets
19. The Opening Bell: Where currencies start on Wednesday, May 30, 2018
20. Shilling among currencies tipped to weaken this week
21. Hospital launches rehab clinic to treat cryptocurrency addiction
22. Most Asian currencies hit by selloff over Italy, Indonesia central bank eyed
23. Currencies: Italian Risk-Off Trade Hammers Euro. Yen Resumes Its Safe Haven Role
24. Lira tumble reverberates across emerging market currencies
25. UK: MAS Clampdown: Implications For Virtual Currencies In Singapore
26. Currencies Trade Near 50-Week Average as Lira Slumps: Inside EM
27. Dollar up as commodity-linked currencies slip on oil price slump
28. Geopolitical flare-ups give haven currencies a renewed boost
29. Weather currency storm by hiding in IT: Jagannadham Thunuguntla, Centrum Broking
30. Indian rupee worst hit among Asian currencies this year, check out others
31. Pressure on Hong Kong to Scrap Currency Peg

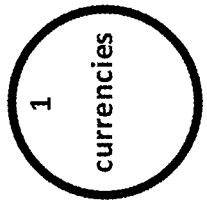

1 currencies

"currency":
['security', 'exchanges', 'virtual', 'monero', 'digital', 'industry', 'creating', 'initial', 'ethereum', 'coin', 'companies', 'guidance', 'based', 'illicit', 'sanctions', 'director', 'laundering', 'local', 'currencies', 'new', 'support', 'suggests', 'profit', 'raise', 'cryptocurrency', 'firms', 'financial', 'regulated', 'space', 'issued', 'bitcoin', ...]

"financial markets":
['yields', 'hike', 'federal', 'fed', 'asian', 'expect', 'reserve', 'sentiment', 'yield', 'inflation', 'set', 'expectations', 'play', 'head', 'meeting', 'foreign', 'trade', 'bid', 'trading', 'factor', 'korea', 'note', 'advertisement', 'role', 'assets', 'strategist', 'gains', 'slow', 'treasury', 'yuan', 'currencies', ...]

"global economy":
['euro', 'traders', 'global', 'yen', 'greenback', 'countries', 'liquidity', 'drop', 'demand', 'europe', 'economy', 'international', 'outlook', 'yuan', 'major', 'region', 'european', 'foreign', 'dollar', 'concerns', 'china', 'policy', 'investors', 'strategist', 'slow', 'currency', 'holiday', 'economic', 'index', 'local', 'currencies', ...]

"currency technologies":
['address', 'technology', 'eu', 'public', 'cryptocurrencies', 'space', 'legal', 'set', 'cryptocurrency', 'funds', 'future', 'parliament', 'financial', 'provide', 'april', 'continued', 'exchange', 'law', 'issued', 'role', 'focus', 'based', 'play', 'potential', 'etherum', 'bid', 'march', 'laudering', 'positive', 'risk', 'future', ...]

"market statistical measures":
['index', 'holiday', 'region', 'tuesday', 'labour', 'bid', 'economic', 'inflation', 'central', 'april', 'expected', 'meeting', 'liquidity', 'consumer', 'concerns', 'yield', 'factor', 'closed', 'european', 'released', 'policy', 'march', 'dollar', 'reading', 'activity', 'senior', 'note', 'europe', 'strategist', 'current', 'central', ...]

"regulations":
['hong', 'kong', 'regulators', 'continued', 'bitcoin', 'payment', 'risk', 'financing', 'regulated', 'released', 'risk', 'offerings', 'legal', 'consumer', 'stated', 'services', 'potential', 'illicit', 'coin', 'law', 'issued', 'sector', 'initial', 'laundering', 'public', 'continue', 'financial', 'treasury', 'cryptocurrencies', 'bitcoin', ...]

"investments":
['official', 'gains', 'investors', 'index', 'sector', 'economic', 'china', 'closed', 'profit', 'hong', 'kong', 'released', 'potential', 'greenback', 'reading', 'north', 'sentiment', 'australia', 'follow', 'region', 'note', 'trade', 'expectations', 'korea', 'companies', 'impact', 'japan', 'reported', 'head', 'banks', 'yen', ...]

*underlying finance theme*   *theme name*   *theme subject*

FIG. 3B

| id | search terms | title | text | link |
|---|---|---|---|---|
| 1 | ['currencies', 'canada'] | IMF's Dong He: Bitcoin Can Rival Central Bank Currencies | "There are many different opinions on whether or not Bitcoin and other cryptocurrencies have a ..." | https://themerkle.com/imfs-dong-he-bitcoin-can-rival-central-bank-currencies/ |
| 2 | ['currencies', 'canada'] | Ripple (XRP) Centered SBI Virtual Currencies Exchange Updates its Website, Looks Ready To Launch | The Ripple (XRP) Reddit community is always on its toes in terms of Ripple related news. The HODLers of the coin, who are also known as Ripplers, are one of ... | https://ethereumworldnews.com/ripple-xrp-centered-sbi-virtual-currencies-exchange-updates-its-website-looks-ready-to-launch/ |
| 3 | ['currencies', 'canada'] | Currencies steady despite Washington's latest trade move | Foreign exchange and sovereign debt markets were steady on Friday despite fresh global ..." | https://www.ft.com/content/970641ae-652d-11e8-90c2-9563a0613e56 |
| ... | ... | ... | ... | ... |
| 59 | ['currencies', 'canada'] | Will Johnson's path back to Canadian national team not an easy one | Canada Soccer threw a lot of people for a loop earlier this year when it fired men's team coach Octavio Zambrano and ..." | https://www.sportsnet.ca/soccer/will-johnsons-path-back-canadian-national-team-not-easy-one/ |

Filtered Article Text

The Ripple XRP Reddit community toes Ripple The HODLers coin Ripplers enthusiastic communities Reddit platform It surprise spot updates SBI Virtual Currencies exchange website Reddit user Reddit developments Although live updated customer ready They overview guide Q A Cryptocurrency Virtual Currency risks CryptoCurrencies secure CryptoCurrencies The key word observation website customer ready You judge os visiting SBI Virtual Currencies The Reddit user noticed XRP coin description website indicating SBI Holdings Group making Ripple centerpiece cryptocurrency exchange The CEO SBI Holdings Yoshitaka Kitao quoted hopes SBI Virtual Currencies Exchange When blink eye tremendous build bear We pursue safety His comments announcement cryptocurrency exchange launched summer A quick google search Summer graces country Japan yields This cusp release SBI exchange With Ripple centered crypto exchange XRP surely strides The coin trading hours The total market capitalization recovered Billion lost valued Billion That stands Billion The expectations uptrend continue

FIG. 7

| | |
|---|---|
| (0, 367) | 1 |
| (0, 341) | 1 |
| (0, 188) | 1 |
| (0, 404) | 1 |
| (0, 233) | 1 |
| (0, 182) | 1 |
| (0, 234) | 1 |
| (0, 45) | 1 |
| (0, 405) | 1 |
| (0, 652) | 1 |
| (0, 534) | 1 |
| (0, 570) | 1 |
| (0, 211) | 2 |
| (0, 175) | 1 |
| (0, 663) | 1 |
| (0, 403) | 1 |
| (0, 19) | 1 |
| (0, 189) | 3 |
| (0, 458) | 1 |
| (0, 132) | 1 |
| (0, 91) | 1 |
| (0, 446) | 1 |
| (0, 571) | 2 |
| (0, 497) | 1 |
| (0, 212) | 1 |
| ⋮ | ⋮ |
| (58, 206) | 1 |
| (58, 646) | 1 |
| (58, 32) | 1 |
| (58, 552) | 1 |
| (58, 475) | 1 |
| (58, 500) | 1 |
| (58, 506) | 2 |
| (58, 383) | 1 |
| (58, 550) | 1 |
| (58, 87) | 5 |
| (58, 86) | 8 |
| (58, 147) | 1 |
| (58, 155) | 3 |
| (58, 544) | 1 |
| (58, 684) | 1 |
| (58, 404) | 1 |
| (58, 405) | 1 |
| (58, 663) | 1 |
| (58, 132) | 1 |
| (58, 283) | 1 |
| (58, 572) | 2 |
| (58, 265) | 1 |
| (58, 636) | 1 |
| (58, 401) | 2 |
| (58, 273) | 1 |

FIG. 7A

Generated Themes
(showing top 10 theme subjects per theme)

topic # 1:
['offered', 'free', 'canadian', 'national', 'offers', 'good', 'local', 'set', 'surprised', 'copper']
topic # 2:
['ripple', 'financial', 'technology', 'payments', 'currencies', 'blockchain', 'direct', 'payment', 'market', 'banks']
topic # 3:
['bank', 'banks', 'commercial', 'central', 'paper', 'local', 'dollars', 'dollar', 'demand', 'financial']
topic # 4:
['bank', 'central', 'dollar', 'trade', 'markets', 'tariffs', 'currency', 'policy', 'market', 'economy']
topic # 5:
['canada', 'canadian', 'dollar', 'businesses', 'opportunities', 'industry', 'country', 'consumers', 'senate', 'provinces', 'local']
topic # 6:
['bank', 'director', 'cautious', 'chance', 'key', 'inflation', 'unemployment', 'central', 'caused', 'housing']
topic # 7:
['quarter', 'canada', 'housing', 'british', 'bank', 'economy', 'economists', 'market', 'canadian', 'investment']
topic # 8:
['canadian', 'list', 'performance', 'gold', 'international', 'place', 'test', 'rules', 'positive', 'canada']
topic # 9:
['oil', 'climate', 'canada', 'mountain', 'story', 'country', 'continues', 'advertisement', 'energy', 'economic']
topic # 10:
['needed', 'win', 'play', 'japanese', 'ottawa', 'czech', 'complete', 'face', 'american', 'completed']
topic # 11:
['canada', 'canadian', 'aluminum', 'steel', 'trump', 'tariffs', 'trudeau', 'trade', 'american', 'national']
topic # 12:
['ripple', 'technology', 'currencies', 'exchange', 'market', 'financial', 'transaction', 'direct', 'success', 'gold']
topic # 13:
['bitcoin', 'currency', 'gold', 'securities', 'icos', 'exchange', 'trading', 'currencies', 'market', 'digital']
topic # 14:
['investors', 'community', 'advertisement', 'icos', 'market', 'blockchain', 'platform', 'issues', 'sale', 'securities']
topic # 15:
['digital', 'currency', 'currencies', 'central', 'cryptocurrencies', 'bank', 'banks', 'exchanges', 'financial', 'study']

FIG. 8

Evaluation of Generated Themes
(showing top 10 theme subjects per theme)

topic # 2

['ripple', 'financial', 'technology', 'payments', 'currencies', 'blockchain', 'direct', 'payment', 'market', 'banks']

evaluation
*Topic #2 is finance related since some of its top 10 theme subjects matched some words of the "finance keywords list", i.e. it matched the financial, currencies, blockchain, and banks words!* topic # 10

['needed', 'win', 'play', 'japanese', 'ottawa', 'czech', 'complete', 'face', 'american', 'completed']

evaluation
*Topic #10 is not finance related since some of its top 10 theme subjects did not match any words of the "finance keywords list"!*

Finance Keywords List

['collateral', 'GDP', 'spending', 'pricing', 'wages', 'assets', 'futures', 'policy', 'premiums', 'greenspan', 'industries', 'volatility', 'expansion', 'consensus', 'cycle', 'repurchases', 'tbills', 'yields', 'upside', 'projected', 'uptick', 'exposure', 'statistic', 'gold', 'forecasts', 'ipo', 'equity', 'economy', 'emerging', 'strategy', 'geopolitical', 'acquisitions', 'revenues', 'profit', 'trajectory', 'target', 'swaps', 'ECB', 'hawkish', 'flattening', 'reform', 'asset', 'cents', 'earnings', 'consumer', 'tax', 'commodities', 'mortgage', 'recession', 'deregulation', 'pullback', 'fund', 'banks', 'returns', 'steepening', 'currencies', 'spreads', 'unemployment', 'trading', 'deflation', 'bonds', 'regulation', 'inflation', 'investors', 'credit', 'buyback', 'correction', 'bond', 'margins', 'mergers', 'marketcap', 'value', 'rangebound', 'capital', 'yield', 'metals', 'treasury', 'dollar', 'maturities', 'portfolio', 'economic', 'curves', 'depreciation', 'investor', 'catalysts', 'monetary', 'unwinding', 'ladder', 'bull', 'supply', 'economically', 'collapse', 'commodity', 'issuance', 'confidence', 'dovish', 'shareholders', 'federal', 'financial', 'deficit', 'legislation', 'fed', 'upswing', 'income', 'risk', 'tenure', 'consolidation', 'securities', 'manufacturer', 'manufacturers', 'blockchain', 'currency', 'cryptocurrency', 'cryptocurrencies', 'utilities', 'bank', 'energy', 'mining', 'oil', 'chemicals', 'tariff', 'tariffs', 'liquidity', 'government', 'industry']

FIG. 9

Generated Themes
(showing top 10 theme subjects per theme)

topic # 1:
['securities', 'currency', 'icos', 'exchange', 'exchanges', 'currencies', 'trading', 'investors', 'bitcoin', 'digital']
topic # 2:
['gold', 'digital', 'dollar', 'euro', 'currency', 'market', 'italy', 'markets', 'metals', 'european']
topic # 3:
['policy', 'trade', 'quarter', 'bank', 'renewed', 'yields', 'central', 'mark', 'unchanged', 'watch']
topic # 4:
['aluminum', 'canadian', 'canada', 'ripple', 'producers', 'industry', 'trump', 'production', 'british', 'financial']
topic # 5:
['turkey', 'finance', 'size', 'moment', 'tariffs', 'coming', 'operations', 'ripple', 'century', 'payments']
topic # 6:
['exchange', 'ripple', 'comments', 'tariffs', 'cryptocurrency', 'coin', 'market', 'dollar', 'currencies', 'sign']
topic # 7:
['oil', 'climate', 'exchange', 'currencies', 'technology', 'blockchain', 'cryptocurrencies', 'success', 'european', 'direct']
topic # 8:
['canada', 'tariffs', 'bank', 'trade', 'steel', 'central', 'nafta', 'trump', 'mexico', 'deal']
topic # 9:
['housing', 'british', 'measures', 'tax', 'market', 'columbia', 'party', 'canadians', 'buyers', 'place']
topic # 10:
['bank', 'local', 'dollar', 'dollars', 'demand', 'commercial', 'banks', 'stable', 'central', 'currency']
topic # 11:
['businesses', 'paper', 'economy', 'consumers', 'commercial', 'government', 'set', 'material', 'canadian', 'private']
topic # 12:
['central', 'dollar', 'bank', 'currency', 'bitcoin', 'markets', 'emerging', 'currencies', 'policy', 'gold']
topic # 13:
['canada', 'canadian', 'securities', 'bank', 'currency', 'understand', 'commercial', 'trading', 'tariffs', 'yields']
topic # 14:
['canada', 'country', 'canadian', 'industry', 'applications', 'countries', 'economic', 'political', 'expected', 'tax']
topic # 15:
['central', 'bank', 'securities', 'currency', 'announced', 'meeting', 'minister', 'monetary', 'association', 'raise']

FIG. 11

Results of "Domain-Specific LDA" algorithm

Stats

- after 4 recursions, 46 documents were left from original 59 documents and a theme corpus of 15 underlying finance themes has been generated

Removed Articles

The following removed articles are focused on weather, crime, education, or sports, but also some news about politics that were not relevant enough to influence the generated topic*.

- "I'm covered in poo": Transport Canada investigating feces falling from sky
- Brutal cool down for Atlantic Canada; more snow on the way
- Former Taliban hostage facing criminal charges in Canada granted bail: report
- Canada advances to Cup quarter-finals at London 7s
- Canadas Gabriela Dabrowski wins both of her doubles matches at French Open
- Will Johnson's path back to Canadian national team not an easy one
- Is pot 'performance-enhancing'? Canadian and international anti-doping bodies disagree
- New questions about old Canadian study foreshadowing opioid crisis
- How to sustain Canadas brain gain
- An Ottawa Hotel Is an Ode to Canada
- Will a Canadian Donald Trump Become Ontarios Leader?
- *HIGH TIME: Senate to finally vote on legalizing recreational weed in Canada
- *The Possibility Of Kinder Morgan Exiting Canada After $3.5B Pipeline Sale

FIG. 12

Selected Themes
(showing top 30 theme subjects per theme)
-> every other theme had no TFIDF theme subject and therefore it was eliminated 37 % of tokens (theme subjects)
topic # 8:
['canada', 'tariffs', 'bank', 'trade', 'steel', 'central', 'nafta', 'trump', 'mexico', 'deal', 'aluminum', 'currencies', 'ripple', 'financial', 'canadian', 'xrp', 'economy', 'trudeau', 'banks', 'president', 'technology', 'digital', 'market', 'oil', 'quarter', 'american', 'national', 'cryptocurrencies', 'talks', 'united']

23.9 % of tokens
topic # 12:
['central', 'dollar', 'bank', 'currency', 'bitcoin', 'markets', 'emerging', 'currencies', 'policy', 'gold', 'lira', 'peso', 'inflation', 'market', 'investors', 'turkey', 'meeting', 'economic', 'key', 'global', 'minister', 'argentina', 'crisis', 'pressure', 'president', 'trade', 'government', 'south', 'monetary', 'yields']

15.7 % of tokens
topic # 2:
['gold', 'digital', 'dollar', 'euro', 'currency', 'market', 'italy', 'markets', 'metals', 'european', 'currencies', 'investors', 'eurozone', 'financial', 'economy', 'trade', 'continue', 'happen', 'eu', 'government', 'italian', 'precious', 'crisis', 'europe', 'risk', 'lot', 'yield', 'volatility', 'cryptocurrencies', 'bonds']

6.5 % of tokens
topic # 1:
['securities', 'currency', 'icos', 'exchange', 'exchanges', 'currencies', 'trading', 'investors', 'bitcoin', 'digital', 'involved', 'coin', 'platform', 'offerings', 'subject', 'issued', 'market', 'commission', 'public', 'regulatory', 'concerns', 'stock', 'cryptocurrencies', 'capital', 'initial', 'sale', 'applications', 'funds', 'online', 'fiat']

5.2 % of tokens
topic # 4:
['aluminum', 'canadian', 'canada', 'ripple', 'producers', 'industry', 'trump', 'production', 'british', 'financial', 'primary', 'blockchain', 'american', 'gains', 'companies', 'age', 'finance', 'war', 'trade', 'administration', 'xrp', 'cbc', 'steel', 'cost', 'consumers', 'market', 'credit', 'military', 'entire', 'tariffs']

5.1 % of tokens
topic # 14:
['canada', 'country', 'canadian', 'industry', 'applications', 'countries', 'economic', 'political', 'expected', 'tax', 'crisis', 'hope', 'production', 'government', 'market', 'operations', 'exports', 'referred', 'offerings', 'cases', 'capital', 'order', 'consumers', 'concern', 'purchase', 'minister', 'stocks', 'situation', 'decisions', 'alberta']

2.7 % of tokens
topic # 11:
['businesses', 'paper', 'economy', 'consumers', 'commercial', 'government', 'set', 'material', 'canadian', 'private', 'environment', 'national', 'public', 'retail', 'financial', 'play', 'canadians', 'local', 'places', 'federal', 'shared', 'quebec', 'products', 'future', 'governments', 'global', 'economies', 'lost', 'canada', 'costs']

2.2 % of tokens
topic # 9:
['housing', 'british', 'measures', 'tax', 'market', 'columbia', 'new', 'party', 'canadians', 'buyers', 'place', 'buy', 'university', 'lose', 'costs', 'united', 'government', 'local', 'foreign', 'crisis', 'states', 'economist', 'proposed', 'live', 'popular', 'living', 'laws', 'climate', 'deep', 'politicians']

1.6 % of tokens
topic # 10:
['bank', 'local', 'dollar', 'dollars', 'demand', 'commercial', 'banks', 'stable', 'central', 'currency', 'expected', 'coming', 'current', 'gains', 'range', 'buyers', 'supply', 'traders', 'pressure', 'lot', 'national', 'trade', 'currencies', 'market', 'energy', 'losses', 'sentiment', 'africa', 'remain', 'note']

FIG. 13

Generated Themes topic # 4:
*LDA top theme subjects*
['aluminum', 'canadian', 'canada', 'ripple', 'producers', 'industry', 'trump', 'production', 'british', 'financial']
*TFIDF top subjects*
['producers', 'primary', 'industry', 'aluminium', ...]

> theme would be named "producers" (it did not find yet match in our own finance themes corpus, which is in progress...)

FIG. 14

Finance Themes Corpus

| Theme | | | | | | | | | | |
|---|---|---|---|---|---|---|---|---|---|---|
| U.S. Gov't Deficit | yield curves | inflation | fixed income | debt | deficit | t-bills | maturities | prices | supply | ladder | portfolio |
| Inflation | inflation | treasury yields | equity markets | volatility | wages | producer | business cycle | federal spending | asset class | consumer | strategy |
| Volatility | upside | volatility | recession | consumer confidence | unemployment | economy | geopolitical | pullback | market cycle | risk | spending |
| U.S. Dollar (Greenback) | us dollar | emerging markets | commodities | interest rates | central banks | currencies | unemployment | inflation | recovery | commodity | fund flows |
| Bond Yields | monetary policy | bond yields | inflation | central banks | correction | core inflation | deflation | profit | margins | pricing power | tightening |
| Share buybacks | marketcap | share buyback | rally | tax reform | momentum | shareholders | investors | market value | downside | repurchases | shares outstanding |
| Bond Sell-Off | gains | fixed income | yields | inflation | portfolio construction | tax reform | central banks | China | catalysts | basis points | earnings |
| Monetary Policy | FED minutes | yield curves | interest rates | recession | forecasts | issuance | depreciation | flattening | duration | premiums | credit spreads |
| Central Banks | central banks | FED | ECB | interest rates | inflation | unemployment | assets | projected | growth | outlook | trajectory |
| Asset Allocation | economic growth | currencies | global markets | recession | portfolio construction | fixed income | bond yields | upswing | bull market | secular | cyclical |
| Tax Cuts/Taxes | tax reform | tax cuts | equity markets | GDP | income tax | mergers | acquisitions | legislation | industries | manufacturing | mortgage |
| Yield Curve | yield curves | t-bills | FED | recession | inflation | range-bound | overheating | performance | offset | steepening | bonds |
| Global Economy | global economy | GDP | uptick | expansion | consensus | consolidation | economically-sensitive | sentiment | revenues | indicators | crisis |
| Federal Reserve | FED | inflation | interest rates | financial reform | regulation | unwinding | balance sheet | target | dovish | hawkish | deregulation |

FIG. 15

Underlying Finance Themes
(showing top 30 theme subjects per theme)

"tariffs on/by canada"
['canada', 'tariffs', 'bank', 'trade', 'steel', 'central', 'nafta', 'trump', 'mexico', 'deal', 'aluminum', 'currencies', 'ripple', 'financial', 'canadian', 'xrp', 'economy', 'trudeau', 'banks', 'president', 'technology', 'digital', 'market', 'oil', 'quarter', 'american', 'national', 'cryptocurrencies', 'talks', 'united']

"global economy":
['central', 'dollar', 'bank', 'currency', 'bitcoin', 'markets', 'emerging', 'currencies', 'policy', 'gold', 'lira', 'peso', 'inflation', 'market', 'investors', 'turkey', 'meeting', 'economic', 'key', 'global', 'minister', 'argentina', 'crisis', 'pressure', 'president', 'trade', 'government', 'south', 'monetary', 'yields']

"financial markets":
['gold', 'digital', 'dollar', 'euro', 'currency', 'market', 'italy', 'markets', 'metals', 'european', 'currencies', 'investors', 'eurozone', 'financial', 'economy', 'trade', 'continue', 'happen', 'eu', 'government', 'italian', 'precious', 'crisis', 'europe', 'risk', 'lot', 'yield', 'volatility', 'cryptocurrencies', 'bonds']

"investments"
['securities', 'currency', 'icos', 'exchange', 'exchanges', 'currencies', 'trading', 'investors', 'bitcoin', 'digital', 'involved', 'coin', 'platform', 'offerings', 'subject', 'issued', 'market', 'commission', 'public', 'regulatory', 'concerns', 'stock', 'cryptocurrencies', 'capital', 'initial', 'sale', 'applications', 'funds', 'online', 'fiat']

"producers"
['aluminum', 'canadian', 'canada', 'ripple', 'producers', 'industry', 'trump', 'production', 'british', 'financial', 'primary', 'blockchain', 'american', 'gains', 'companies', 'age', 'finance', 'war', 'trade', 'administration', 'xrp', 'cbc', 'steel', 'cost', 'consumers', 'market', 'credit', 'military', 'entire', 'tariffs']

"canadian politics":
['canada', 'country', 'canadian', 'industry', 'applications', 'countries', 'economic', 'political', 'expected', 'tax', 'crisis', 'hope', 'production', 'government', 'market', 'operations', 'exports', 'referred', 'offerings', 'cases', 'capital', 'order', 'consumers', 'concern', 'purchase', 'minister', 'stocks', 'situation', 'decisions', 'alberta']

"business":
['businesses', 'paper', 'economy', 'consumers', 'commercial', 'government', 'set', 'material', 'canadian', 'private', 'environment', 'national', 'public', 'retail', 'financial', 'play', 'canadians', 'local', 'places', 'federal', 'shared', 'quebec', 'products', 'future', 'governments', 'global', 'economies', 'lost', 'canada', 'costs']

"housing market":
['housing', 'british', 'measures', 'tax', 'market', 'columbia', 'new', 'party', 'canadians', 'buyers', 'place', 'buy', 'university', 'lose', 'costs', 'united', 'government', 'local', 'foreign', 'crisis', 'states', 'economist', 'proposed', 'live', 'popular', 'living', 'laws', 'climate', 'deep', 'politicians']

"banking":
['bank', 'local', 'dollar', 'dollars', 'demand', 'commercial', 'banks', 'stable', 'central', 'currency', 'expected', 'coming', 'current', 'gains', 'range', 'buyers', 'supply', 'traders', 'pressure', 'lot', 'national', 'trade', 'currencies', 'market', 'energy', 'losses', 'sentiment', 'africa', 'remain', 'note']

FIG. 16

PORTFOLIO-BASED TEXT ANALYTICS TOOL

CROSS-REFERENCE TO RELATED APPLICATIONS

This application claims all benefit including priority to U.S. Provisional Patent Application 62/684,383, filed Jun. 13, 2018, and entitled "PORTFOLIO-BASED TEXT ANALYTICS TOOL", the entirety of which is hereby incorporated by reference.

FIELD

The present disclosure generally relates to the field of natural language processing, and in particular, aspects of the present disclosure relate to systems, methods, and computer-readable media for natural language processing.

BACKGROUND

Technology has drastically increased the ease and rate at which information is created and shared. In industries, research fields, or other areas where being up-to-date with the latest information is important, it can be a challenge to keep up with the volume of information.

SUMMARY

In some embodiments, aspects of the present disclosure provide a recursive domain-specific natural language processing process for serving content items and/or identifying domain-related themes for a plurality of content items.

In some embodiments, aspects of the present disclosure are configured to find underlying domain-related themes for a subject of interest which may in some situations be obscured in a large quantity of content items.

In accordance with one aspect, there is provided a computer-implemented system for natural language processing. The system includes: at least one memory and at least one processor configured to provide a domain-specific natural language processing engine, the domain-specific natural language processing engine configured for: obtaining a content item matrix including word data from a plurality of content items; with a natural language processing topic model, generating from the content item word matrix a corpus of themes and a plurality of theme tokens associated with each them in the corpus of themes; when each of the plurality of theme tokens associated with a first theme in the corpus of themes fails to match any of a plurality of domain-specific keywords: modifying the content item matrix to remove word data for at least one dominant content item for the first theme; and regenerating from the modified content item word matrix the corpus of themes and the plurality of theme tokens associated with each theme in the regenerated corpus of themes with the natural language processing topic model; ranking themes from the regenerated corpus of themes based on relative distributions of the theme tokens of the respective themes in the regenerated corpus of themes; and generating domain-specific output text for one or more of the ranked themes.

In accordance with another aspect, there is provided a method for natural language processing. The method includes: obtaining a content item matrix including word data from a plurality of content items; when each of the plurality of theme tokens associated with a first theme in the corpus of themes fails to match any of a plurality of domain-specific keywords: modifying the content item matrix to remove word data for at least one dominant content item for the first theme; and regenerating from the modified content item word matrix the corpus of themes and the plurality of theme tokens associated with each theme in the regenerated corpus of themes with the natural language processing topic model; ranking themes from the regenerated corpus of themes based on relative distributions of the theme tokens of the respective themes in the regenerated corpus of themes; and generating domain-specific output text for one or more of the ranked themes.

In accordance with another aspect, there is provided a non-transitory, computer-readable medium or media having stored thereon computer executable instructions which when executed configure at least one processor for: obtaining a content item matrix including word data from a plurality of content items; with a natural language processing topic model, generating from the content item word matrix a corpus of themes and a plurality of theme tokens associated with each them in the corpus of themes; when each of the plurality of theme tokens associated with a first theme in the corpus of themes fails to match any of a plurality of domain-specific keywords: modifying the content item matrix to remove word data for at least one dominant content item for the first theme; and regenerating from the modified content item word matrix the corpus of themes and the plurality of theme tokens associated with each theme in the regenerated corpus of themes with the natural language processing topic model; ranking themes from the regenerated corpus of themes based on relative distributions of the theme tokens of the respective themes in the regenerated corpus of themes; and generating domain-specific output text for one or more of the ranked themes.

In accordance with an aspect, there is provided a portfolio-based text analytics platform with a processor and a memory storing machine executable instructions to configure the processor to: process text data corpus from articles using a natural language processor to generate themes; generate visual elements for an interface application that represent the themes; trigger the display of the visual elements on the interface application at a display, the visual elements having interactive indicia for selection to dynamically update the visual elements and select one or more themes to generate additional visual elements corresponding to the selected one or more themes.

In some embodiments, the processor is configured to collect the articles using a crawler and store the articles in a data storage device.

In some embodiments, the crawler receives a set of search terms and collects the articles using the search terms.

In some embodiments, the processor is configured to store the search terms as string object items of a list for provision to the crawler.

In some embodiments, the processor is configured to use the natural language processor to rank the themes in relation to a field.

In some embodiments, the processor is configured to use the natural language processor to convert each of the articles into an article word matrix of word tokens and corresponding frequencies.

In some embodiments, the processor is configured with a Latent Dirichlet Allocation (LDA) model to generate a theme corpus for the themes for use by the natural language processor, the theme corpus being a list of distinct themes across the articles.

In some embodiments, the natural language processor evaluates each of the themes for domain related themes.

In some embodiments, the processor is configured to generate a relevance score for each of the themes.

In some embodiments, each of the themes is linked to multiple theme subjects.

In some embodiments, the themes are finance themes.

In some embodiments, the processor configures a text analysis tool to tokenize text from the articles, remove irrelevant words, and create a matrix of token counts for the natural language processor.

In some embodiments, the processor configures a domain-specific LDA to generate underlying themes from the articles, compare the themes to a keyword list and iteratively eliminate a portion of articles or themes to produce a list of domain-specific themes for the natural language processor.

In some embodiments, the processor configures the theme measurement tool to, for each of the themes, compute a term-frequency-inverse document frequency score, eliminate themes having no theme subjects with positive term-frequency-inverse document frequency scores, rank themes based on the amount of theme subjects compared to all theme subjects across articles using distributions for theme subjects, and name each of the themes by comparing the highest rank theme subject to established theme names.

In some embodiments, the processor configures a crawler to collect text and titles of the articles and save it in a table with a unique identifier for each article in a data storage device In some embodiments, the platform has a portfolio matching tool to identify one or more portfolios using the themes.

In some embodiments, the processor configures the portfolio matching tool to identify client portfolios affected by a stock ticker recommendation.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

DESCRIPTION OF THE FIGURES

FIGS. 3A and 3B shows example data associated with an example input.

FIG. 6 shows an example data structure storing example content items.

FIG. 6A shows aspects of example data structure storing an example data set.

FIG. 7 shows an example of filtered article text.

FIG. 7A shows an example of article word matrix.

FIG. 8 shows example data structure of an example theme corpus and theme tokens.

FIG. 9 shows example data structures illustrating theme evaluation and a list of domain-specific keywords.

FIG. 11 shows aspects of an example data structure for an example theme corpus and theme tokens.

FIG. 12 shows results of a domain-specific LDA process.

FIG. 13 shows example ranked themes.

FIG. 14 shows example generated themes.

FIG. 15 show an example domain-specific theme corpus.

FIG. 16 shows example domain-specific output text.

DETAILED DESCRIPTION

Embodiments of methods, systems, and apparatus are described through reference to the drawings. Embodiments described herein relate to natural language processing, including natural language understanding, speech recognition, natural-language generation, and so on.

Figure 1:
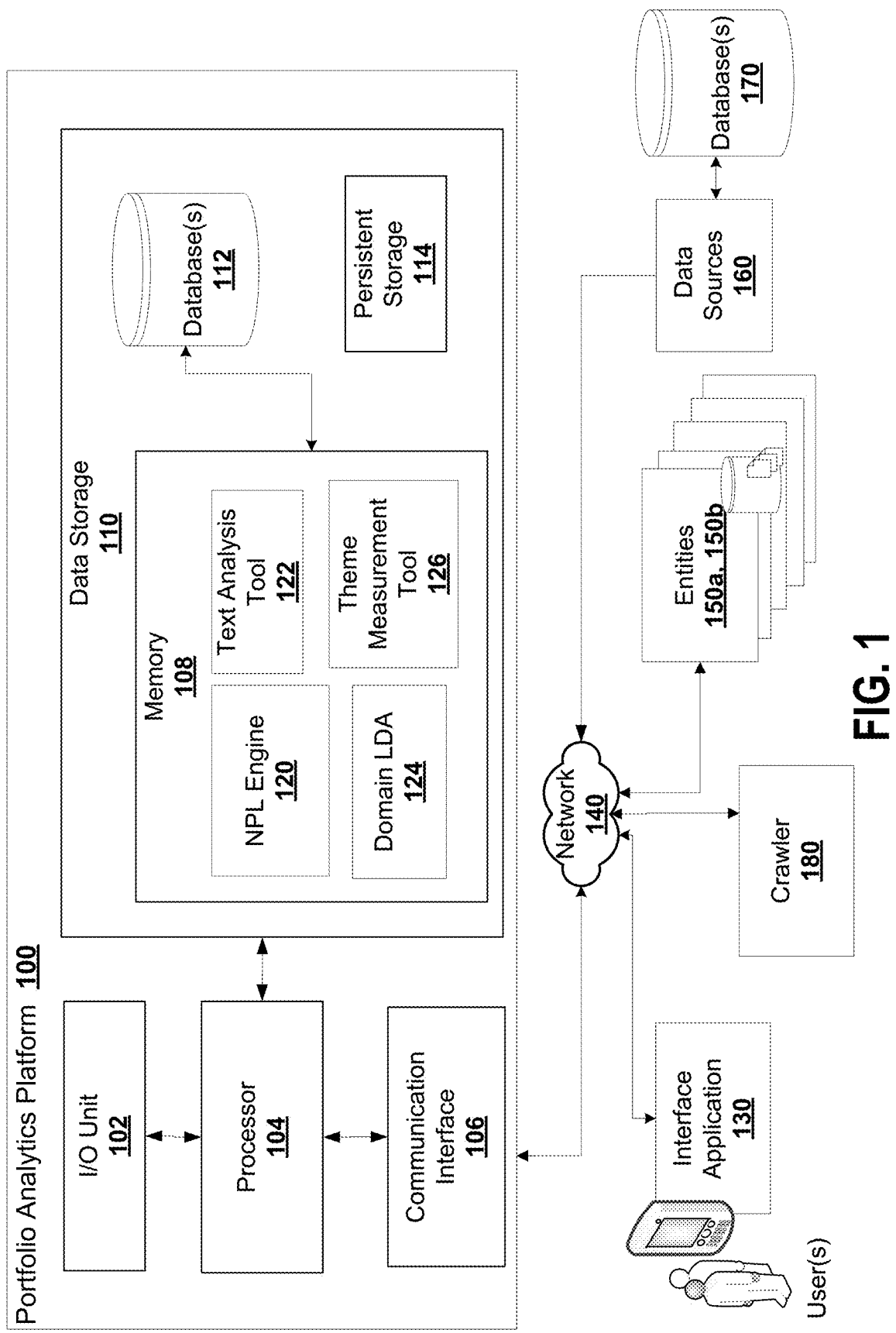
FIG. 1 is a schematic diagram showing aspects of an example text analytics platform according to some embodiments.

FIG. 1 is a schematic diagram of an example portfolio analytics platform 100. The platform 100 can include an I/O Unit 102, a processor 104, communication interface 106, and data storage 110. The processor 104 can execute instructions in memory 108 to implement aspects of processes and/or components described herein. The processor 104 can execute instructions in memory 108 to configure/provide natural language processor/processing engine 120, text analysis tool 122, domain latent Dirichlet allocation (LDA) 124, theme measurement tool 126, and other functions/components described herein.

In some embodiments, the platform 100 connects to crawler 180 (or virtual agent), interface application 130, entities 150, and data sources 160 (with databases 170) using network 140 to receive news articles and other input data for processing. Entities 150 can interact with the platform 100 to provide input data and receive output data. Network 140 (or multiple networks) is capable of carrying data and can involve wired connections, wireless connections, or a combination thereof. Network 140 may involve different network communication technologies, standards and protocols, for example. The interface application 130 can be installed on user device to display an interface of visual elements that can represent output data from the platform 100.

In the age of information, it is difficult to track and process the vast amount of data that is continuously generated, such as news stories that emerge on a second-to-second basis, for example. For investment advisors, keeping up with ever-changing trends is linked to the success of their portfolios. However, in their daily reading, they will most likely be consuming the same news stories produced by a few mainstream publications that every other investor reads.

In an industry where spotting market trends early is vital to financial success, how can an investment advisor identify underlying market themes first? A 'hidden gem' might not be found on the first page of a generic internet search, nor through a limited reading selection of preferred news sources. Therefore, there is a need for an automated tool that can process a huge amount of news articles relevant to a specific field, find the underlying trends within the field, and output a concise view of market themes.

The platform 100 has a customizable crawler 180 and natural language processor 120. The crawler 180 receives user-defined search terms and uses to the search terms to identify and collect related news stories from data source(s) 160. The output of crawler 180 can be a data structure (e.g. stored in Database 112) that can be manipulated for analysis.

The domain LDA 124 can process data and identify themes or topics. The platform 100 can function in a specific domain, such as finance. The platform 100 can associate names with each topic the domain (LDA) 124 identifies, facilitating user comprehension. The names can be linked to the specific domain.

The output of crawler 180 can be analyzed by domain-specific LDA 124. Domain-specific LDA 124 uses a modified Latent Dirichlet Allocation with an iterative process to narrow the scope to a specific domain, such as the financial space. Domain-specific LDA 124 can use statistical rules or measures to automatically assign descriptive names to each topic. This makes consumption of the output much easier, since there is no longer a need for human interpretation of topic content.

The platform 100 can provide a market research tool for finding the underlying themes of a subject of interest across hundreds of thousands of documents. The platform 100 can be used by individuals to better their knowledge in their respective fields, regardless of their subject matter expertise. The power of the platform 100 lies in leveraging the wisdom of the crowd by performing an analysis on the most relevant, recent news stories.

The platform 100 mines a data source 160 such as online news, for example, to build a collection of articles for a given subject. The collection of articles can be the most relevant, up to date articles. The crawler 180 can receive search terms of interest as input, which can represent the overall subject field as the scope of the exploration. The theme measurement tool 126 can measure significance of received underlying themes (from domain LDA 124, for example), and eliminates or selects only significant themes. The theme measurement tool 126 can generate names for themes too. The platform 100 can use the articles collected based on these search terms, and perform Natural Language Processing (NLP) to determine a set of underlying themes within all these articles. This set of themes can be referred to as a "corpus", in which each theme is represented by a list of representative keywords. The platform 100 can provide the listing of keywords in association with the output collection of data to facilitate an understanding of the nature of the themes and how they relate to the field as a whole. Inter-theme relations can also be understood using an interactive themes visualization provided by the platform 100 and the visualization can be displayed at interface application 130.

The following example use case relates to Investment Advisors trying to keep up with the field of global currencies. The platform 100 can receive search terms such as 'currencies', 'inflation', and 'foreign exchange' via the crawler 180. Then, platform 100 can amass a dataset of articles from the internet and other data sources 160, process the dataset using natural language processor 120, identify themes using theme measurement tool 126, and output the theme data. This can enable prediction of themes. For example, this may have enabled prediction of themes such as 'cryptocurrencies', which can impact investment decisions going forward.

In some embodiments, the platform 100 can involve a web application (e.g. at interface application 130), where users type in search terms of their choice for provision to theme measurement tool 126. The platform 100 can compute the underlying themes via generated keywords and generate corresponding visualizations for display at interface application 130. This can give users a fast, in-depth analysis of their field of interest at the tip of their fingertips.

The crawler 180 can receive and search for a large amount of data relating to news articles, from different entities 150 (e.g. network entities, network endpoints) and data sources 160. The crawler 180 can be program or automated script that browses the World Wide Web (or other data sources 160) in a methodical, automated manner.

In some embodiments, natural language processor 120 uses domain-specific LDA 124, text analysis tool 122 and theme measurement tool 126 to analyze the text of the articles retrieved by crawler 180 to generate a set of themes that can be output as visual elements at interface application 130. For example FIG. 3 shows an example interface with a sample list of articles generated by crawler 180 in response to search term "currencies" and the resulting themes generated by natural language processor 120.

The I/O unit 102 can enable the platform 100 to interconnect with one or more input devices, such as a keyboard, mouse, camera, touch screen and a microphone, and/or with one or more output devices such as a display screen and a speaker.

The processor 104 can be, for example, any type of general-purpose microprocessor or microcontroller, a digital signal processing (DSP) processor, an integrated circuit, a field programmable gate array (FPGA), a reconfigurable processor, or any combination thereof.

Memory 108 may include a suitable combination of any type of computer memory that is located either internally or externally such as, for example, random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Data storage devices 110 can include memory 108, databases 112 (e.g. graph database), and persistent storage 114.

The communication interface 106 can enable the platform 100 to communicate with other components, to exchange data with other components, to access and connect to network resources, to serve applications, and perform other computing applications by connecting to a network (or multiple networks) capable of carrying data including the Internet, Ethernet, plain old telephone service (POTS) line, public switch telephone network (PSTN), integrated services digital network (ISDN), digital subscriber line (DSL), coaxial cable, fiber optics, satellite, mobile, wireless (e.g. W-Fi, WMAX), SS7 signaling network, fixed line, local area network, wide area network, and others, including any combination of these.

The platform 100 can be operable to register and authenticate users (using a login, unique identifier, and password for example) prior to providing access to applications, a local network, network resources, other networks and network security devices. The platform 100 can connect to different machines or entities 150.

Figure 1A:
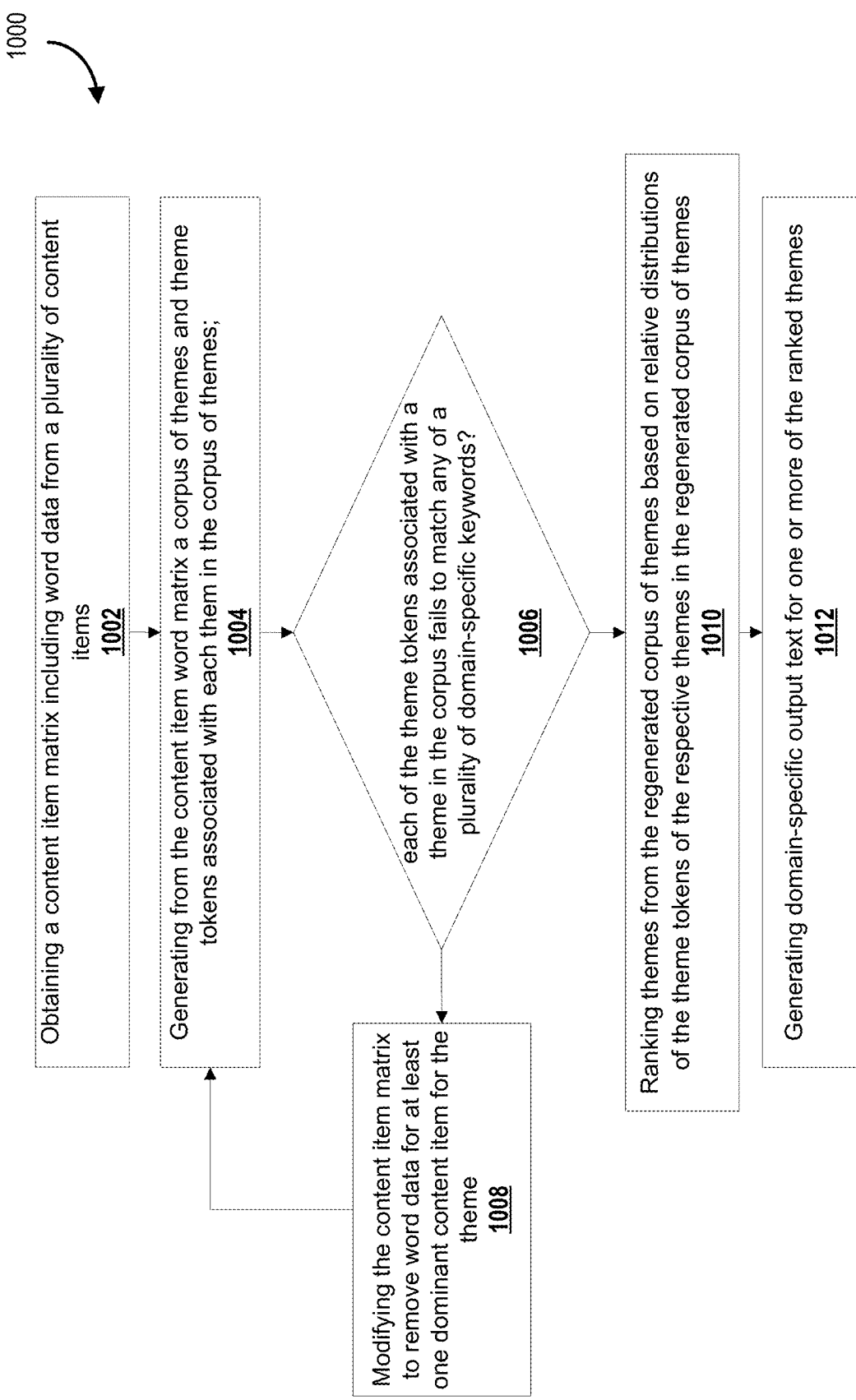
FIG. 1A is a flowchart showing aspects of an example method.

FIG. 1A is a flowchart showing aspects of an example method 1000 by one or more aspects of the system or processes as described herein or otherwise. References to a single processor should be interpreted to include one or more processors.

At 1002, the processor is configured to obtain a content item matrix including word data from a plurality of contents items. In some embodiments, the content items can be articles, documents, webpages, messages, audio data, video data, and/or any other type of information from which text or language can be extracted. In some embodiments, the content items can be from a collection of articles, text from webpages, newsletters, analyst reports, interviews, quarterly reports, press releases, subscription-based news, and/or any other data source(s).

In some embodiments, the content items are associated with an input query. For example, in some embodiments as described herein or otherwise, the content items are obtained by crawling search engine webpage results, or database search results.

In some embodiments, the content items are based on an input query which is derived from an initial content item of interest. In some situations, this may enable the system to obtain themes from other content items related to the information in an initial content item (e.g. a newsletter).

In some embodiments, as described herein or otherwise, the processor is configured to extract word data for the content item matrix from the plurality of content items. In some embodiments, the content item matrix includes data representing the text of all content items associated with the matrix.

At 1004, the processor is configured to generate from the content item word matrix a corpus of themes, and multiple theme tokens associated with each of the themes in the corpus. In some embodiments, the processor generates the matrix and/or theme tokens using a natural language processing topic model. In some embodiments, the natural language processing topic model includes a latent Dirichlet allocation model. In some embodiments, the natural language processing topic model includes a probabilistic latent semantic analysis. In other embodiments, other generative statistical or other models may be used.

In some embodiments, the corpus of themes is a data structure including multiple topics across all of the content items associated with the content item word matrix. In some embodiments, each theme in the corpus of themes is stored in conjunction with an association with one or more tokens. In some embodiments, the theme token can represent or be represented as a keyword or key groups of words.

In some embodiments, the processors are configured to generate up to a defined number of themes. In some embodiments, the defined number is 10 or 15.

In some embodiments, a "Latent Dirichlet Allocation with online variational Bayes algorithm", which uses a "Variational Bayes" method to learn (fit) from content item text data.

In some embodiments, the LDA models each word's theme distribution and matches the word to the theme. It produces themes with their ranked theme subjects according to their distribution within a theme.

At 1006, 1008 and 1004, depending on the generated corpus, the processor recursively reduces or otherwise refines the corpus of themes and the corresponding theme tokens. At 1006, the processor determines if each of the plurality of theme tokens associated with a single theme in the corpus of themes fails to match any of a plurality of domain-specific keywords. In some embodiments, the domain-specific keywords can be a list of keywords associated with a particular field of interest. For example, the domain-specific keywords can be a list of technical or jargon words important or relevant to a particular subject. An example data structure showing a list of keywords associated to the finance domain is illustrated in FIG. 9.

In some embodiments, matching can include exact matching, matching word roots, matching synonyms or other related words, or any other mechanism for determining whether a theme token is associated with one or more keywords in a domain.

In some embodiments, the domain (and the associated domain-specific keywords) is defined for the system as a whole. In some embodiments, the domain may be defined by an input to the system.

When each of the theme tokens associated with a particular theme in the corpus does not match any of the domain-specific keywords, at 1008, the processors modifying the content item matrix to remove word data for at least one dominant content item for the first theme.

At 1004, for each subsequent iteration, the processor regenerates from the modified content item word matrix the corpus of themes and the plurality of theme tokens associated with each theme in the regenerated corpus of themes with the natural language processing topic model.

In some embodiments, during the iterative process, the processor is configured to determine when each of the plurality of theme tokens associated with a particular theme of the corpus of themes fails to match any of a plurality of domain-specific keywords, and when the second theme does not have any dominant content items, removing the particular theme from the corpus of themes.

At 1010, the processor ranks themes from the regenerated corpus of themes based on relative distributions of the theme tokens of the respective themes in the regenerated corpus of themes.

In some embodiments, the processor is configured to filter themes from the regenerated corpus of themes based on importance metrics for the theme tokens associated with each theme in the corpus. In some embodiments, the importance metrics are based on a term frequency-inverse document frequency (TFIDF) score.

At 1012, the processor generates domain-specific output text for one or more of the ranked themes. In some embodiments, generating the output text involves mapping or translating the ranked themes to one or more values in a domain-specific theme corpus.

In some embodiments, the processor is configured to generate signals for communicating the domain-specific output text. In some embodiments, communicating the domain-specific output text includes generating a message including the domain-specific output text.

In some embodiments, communicating the domain specific-output text includes displaying the domain-specific output text on a display device. In some embodiments, the processor can receive one or more of inputs representing a selection of at least a portion of the output text (e.g. a selection of a particular word or phrase), and in response, traversing the ranked themes corresponding to the selection, and the contents item matrix to identify and display information associated with content items corresponding selection. For example, selection of a theme represented by a displayed word can generate the second user interface displaying a listing of content items corresponding to the selection.

In some embodiments, the processor is configured to map the domain-specific output text with at least one symbol stored in association with one or more user accounts; and generate signals for communicating data relating to the domain-specific output text to the one or more user accounts associated with the at least one mapped symbol.

Figure 2:
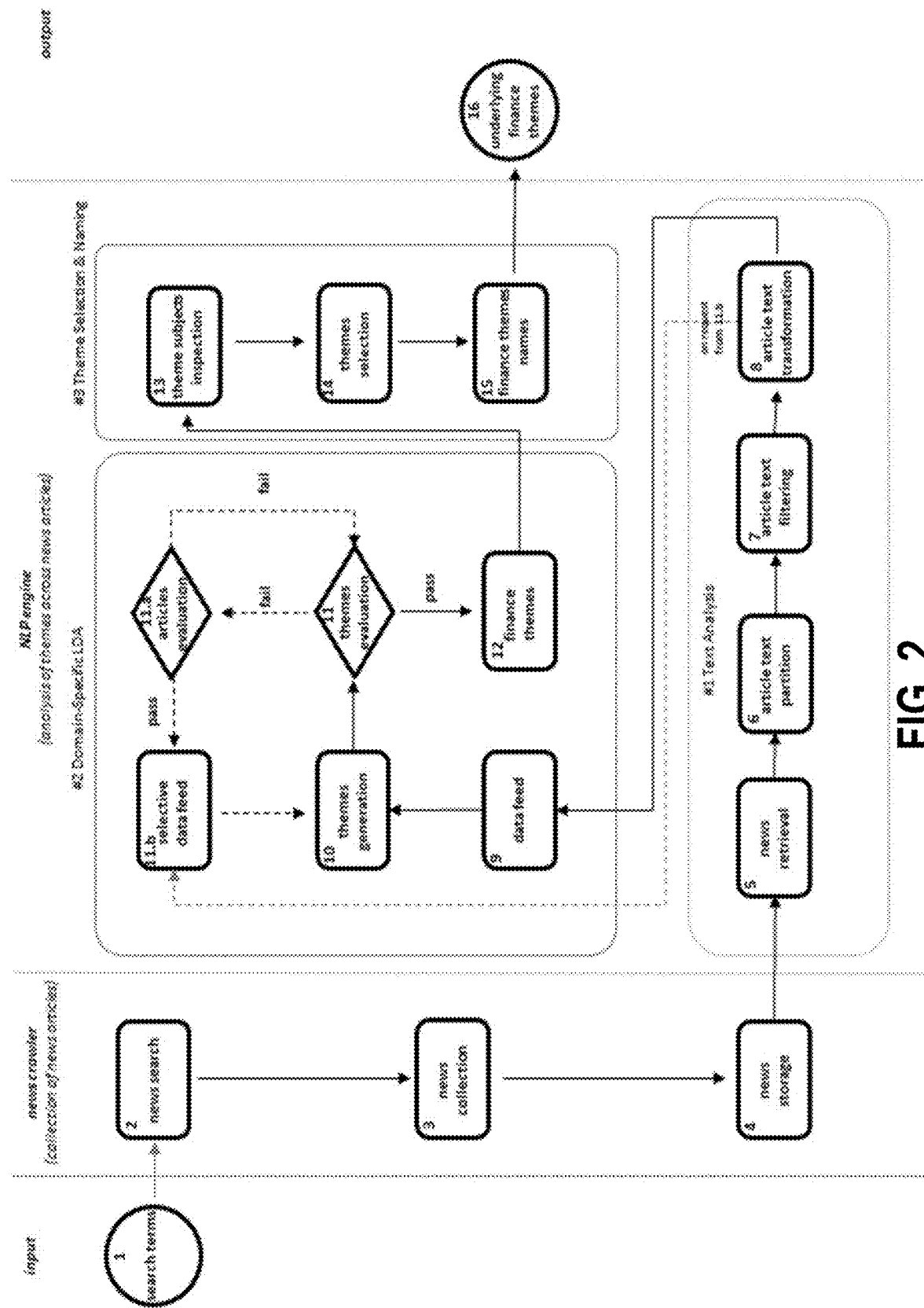
FIG. 2 is a schematic diagram showing aspects of an example data flow according to some embodiments.

FIG. 2 is a schematic diagram showing aspects of an example data flow for natural language processing. In some embodiments, one or more aspects of the examples described below include additional or alternative aspects of the method illustrated in FIG. 1A. In some embodiments, the data flow the system obtains a collection of news articles retrieved by crawler 180 in response to search terms. The platform 100 receives the collection or dataset and transfers the articles to natural language processor 120 and text analysis tool 122 to transform the text of the articles. The domain-specific LDA 124 analyzes the text of the articles and generates themes, and theme measurement tool 126 ranks the themes for relevance to a particular field, for example, finance.

In some embodiments, a user inputs search terms of interest into platform 100. Search terms may be a word or combination of words or characters. In some embodiments, interface application 130 displays sample terms and includes selectable indicia so that users are able to pick their own search terms. This can enable users to be in control what they deem as representative terms for a subject of their interest.

Platform 100 receives as input data the search terms and stores them in memory as string object items placed in one list. This can allow platform 100 to pass them conveniently as a one list object to crawler 180 as opposed to as multiple string objects. Search terms may be stored in memory of platform 100 or in database 112.

Platform 100 provides the search terms to crawler 180. Crawler 180 takes the search terms and searches for articles of interest based on the search terms. In some embodiments, crawler 180 searches data sources 160 for references or links of latest news articles. In some embodiments the platform 100 searches for a threshold or defined number of news articles (approximately) for each supplied search terms in a collection of text from data sources 160, such as an online news, and identifies URL links of found news articles. The news articles can be stored as article URL links in memory as string object items of one list object (this allows since platform 100 to pass them conveniently as a one list object to natural language processor 120 as opposed to as multiple string objects). The URL links or references may be stored in memory of platform 100 or in database 112.

In some embodiments, crawler can search articles in a database of articles rather than crawling links from an online search service.

After crawler 180 has found articles of interest, platform 100 collects the articles and stores them in memory or database 112. In some embodiments platform 100 uses a news extractor to collect articles, including titles and text from their URL links. The platform 100 stores all content from the articles in an "articles" table. For example platform 100 stores article title, text, and link along with its user's search terms for each of collected news article in this table (see FIG. 6 for example). The article content can be stored in a separate column or data structure as string values, with primary key as an identifier (e.g. each row entry) and unique index for the article title and link. Storing the articles in this manner can allow for faster retrieval when using the platform 100 repeatedly. For example, some articles will be already available in in database 112, 170 without a need to download them when there is a repeat search for news articles.

In some embodiments the articles' table has a unique index for the article link and article title columns or data structures so that there are no duplicate articles in the table. Each article can also have a digital signature (e.g. code generated based on the text of the article) with a unique index. This can prevent the natural language processor 120 from being biased by unnecessary focus on particular articles that are duplicated in this table. Also, each article has its own unique identifier, i.e. all table records can be uniquely identified. This prevention of article duplication can take away any duplication of articles that may be present, which is dominant if multiple search terms are performed, i.e. different search terms may end up looking at same articles.

The platform 100 can retrieve the collected news articles from database 112 and process the articles using the natural language platform 120.

Natural language processor 120 provides the collection of articles to text analysis tool 122. In some embodiments, for each article, text analysis tool 122 takes text from the article and removes irrelevant footers from each article text and splits each article text into its individual words. For example, text analysis tool 122 removes any information at the bottom of the article text that contains 'disclaimer' or 'disclosure' words, since such information is irrelevant to information contained in an article text for most cases. Removal of this text prevents the natural language processor 120 from picking up the information from the footers, for example, and affecting the generation of underlying themes.

Text analysis tool 122 converts each article text into its individual word components. For example, text analysis tool 122 may convert each article text into word tokens, by first converting the article text to sentence tokens via a sentence tokenizer, and then by converting text from such sentence tokens into word tokens via a word tokenizer. A word tokenizer can be built around sentences, and therefore such tokenizers assume that they are fed with sentence tokens of the article text. In other words, word tokenizers built around sentences might not be usually fed with a one piece article text that is not sentence tokenized.

Text analysis tool 122 also removes certain words from each article. For example, in certain embodiments stop words, which are the most common words in a language, are removed by text analysis tool 122. They can be removed because they do not contain significance and introduce unnecessary information. In certain embodiments, months, day names, and non-alphabetical words are removed because they have little value describing themes and help to generate better themes.

In some embodiments, stop words include 'is', 'on', or 'are'.

In some embodiments, following removal/filtering of certain words, text analysis tool 122 re-joins the remaining words from the article into sentences to form article text (see FIG. 7 for example).

In some embodiments, text analysis tool 122 then transforms the article title and filtered article text into one consumable article word matrix for the domain-specific LDA 124. The article word matrix can show how often words appear in each article text. For example, in some embodiments the domain-specific LDA 124 looks at word counts. The text analysis tool 122 can vectorize the article to create a word matrix using term frequency features by converting a collection of article texts to a matrix of token counts. The text analysis tool 122 can learn the vocabulary dictionary from data. The text analysis tool 122 can generate a matrix that is a Compressed Sparse Row (CSR) matrix, for example, which takes less memory.

The natural language processor 120 then provides the transformed article text to the domain-specific LDA 124 for identification of themes and elimination of articles. In some embodiments, the articles are provided to the domain-specific LDA 124 in a format that identifies word feature counts in articles and provides titles.

Domain-specific LDA 124 provides the articles to the theme generation tool 220 to generate themes and subjects for the set of articles. In some embodiments, to generate themes, the theme generation tool 220 runs a Latent Dirichlet Allocation (LDA) model on the articles, which finds the underlying themes across all the articles, and produces a theme corpus. For example, FIG. 8 shows 15 themes across supplied articles and 10 theme subjects per theme. A theme is a topic of an article and a theme corpus is a list of distinct themes found across multiple articles and contains different themes brought together as a collection. Each theme in theme corpus is represented by its theme subjects and each theme has usually many theme subjects present (for example, see FIG. 9).

In some embodiments the theme generation tool 220 uses a Latent Dirichlet Allocation with online variational Bayes algorithm. This process can use a Variational Bayes method to learn (fit) from the article text data. The theme generation tool 220 models each word's theme distribution and matches the word to the theme. The theme generation tool 220 produces themes with their ranked theme subjects according to their distribution within a theme.

The ranked themes produced by the theme generation tool 220 are then provided to the themes evaluation tool 222. Themes evaluation tool 222 evaluates the generated theme corpus for specific domain related themes, such as finance. Themes evaluation tool 222 checks the theme subjects against a keyword list. The keyword list allows identification of keywords that are not dominant in other fields. In some embodiments, the keyword list cannot be too large, and therefore, requires content balancing and testing for diverse search terms. If a theme has no matches against the keyword list then themes evaluation tool 222 provides the dataset of the articles to the article evaluation tool 226.

Figure 10:
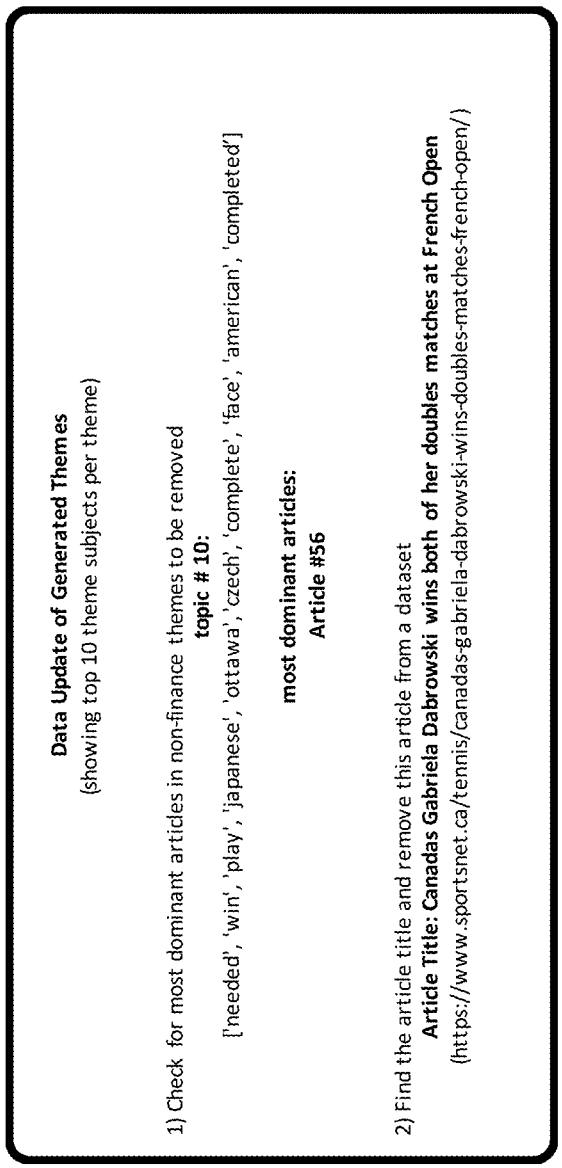
FIG. 10 shows example data structures illustrating data updates to generated themes.
Figure 17:
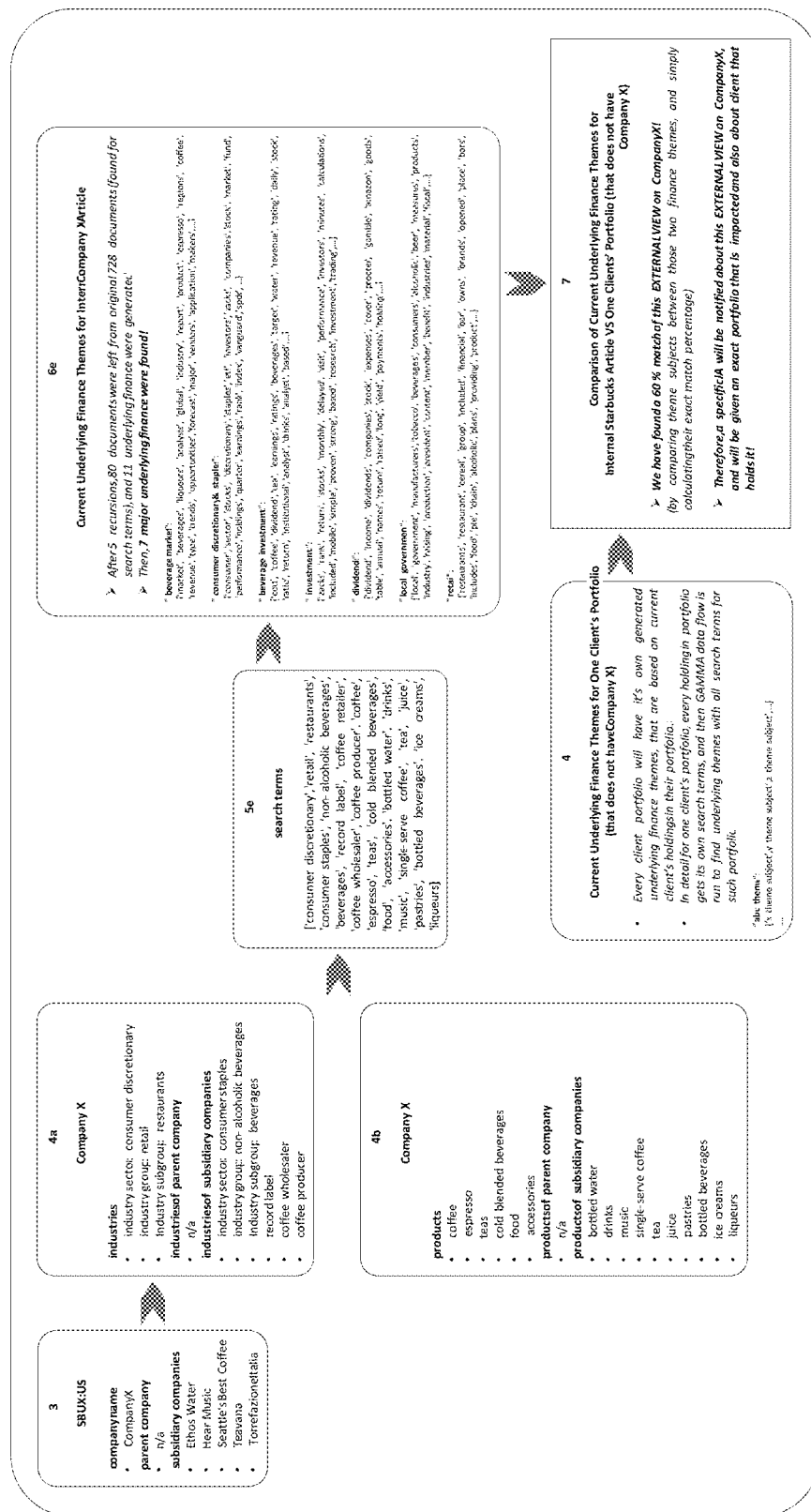
FIG. 17 shows aspects of a simplified data flow for the example process shown in FIG. 4.

Article evaluation tool 226 identifies the top/dominant article(s) for any non-domain specific themes and determines whether there are any top article(s) with non-domain specific themes (for example see FIG. 10). The top article of a particular theme can be the article that is the most dominant in that theme based on a ranking, for example. For each theme, article evaluation tool 226 finds the article(s) that is most dominant by transforming the LDA matrix according to the learned (fitted) model with the document word matrix (e.g. generated by the text analysis tool 122). Article evaluation tool 226 receives an article theme distribution from this transformation and uses the distribution to find the highest distribution of each article in a particular theme. Article evaluation tool 226 is looking only for the most dominant article(s) within themes because removing articles for a theme if those articles are actually more important in other themes would have a negative effect on theme generation.

If the dominant article(s) has one non-finance related theme, or more, then the domain-specific LDA 124 updates the previously supplied dataset by removing the dominant article(s). The dataset, with the non-domain specific top article(s) removed is then provided again to the themes generation tool 220 for generation of themes for the set of articles.

There may be a case when a theme has no dominant articles. For such case, article evaluation tool 226 might not remove an article and rather removes the whole theme since this theme is not finance related and has no dominant articles. The ranked themes with the non-domain specific theme removed are provided to themes evaluation tool 222.

This iterative process continues until every theme in the generated theme corpus contains theme subjects relating to the domain, or until a certain number of iterations have been reached based on a defined or learned threshold. This aligns general themes produced by the LDA to certain fields, for example the field of investment.

Once a list of domain-specific themes has been generated by themes evaluation tool 222, the themes are inspected by theme measurement tool 126. Theme measurement tool 126 receives the underlying domain-specific themes from domain-specific LDA 124 and inspects them across all themes. Theme measurement tool 126 calculates a relevance score for every theme subject received. Theme measurement tool 126 calculates the term frequency-inverse document frequency (TFIDF) scores and computes the LDA distribution for each subject theme. This assists in making a distinction between themes that contain lot of theme subjects that are distinct, i.e. has positive TFIDF score, and ones that do not have any TFIDF theme subjects, i.e. TFIDF score is zero. In addition, this assists in identifying how each token (theme subject) is important to its theme, providing the LDA distribution for each theme subject to identify the most dominant themes. Therefore, how important each theme subject is to its news article is ranked across all collected articles in the dataset to better decide the importance of each theme.

Theme measurement tool 126 then receives relevance scores for every theme subject in every theme and removes the domain-specific themes that are insignificant in comparison to other themes, i.e. eliminating every theme in underlying finance themes that has no theme subject with positive TFIDF score. Theme measurement tool 126 then organizes the themes by their topic distribution i.e. by amount of their theme subjects (tokens) compared to all theme subjects across articles via LDA own distribution for theme subjects. Theme measurement tool 126 can do this in order to evaluate the importance of each theme and eliminate those themes that are better represented already by other stronger themes within a theme corpus.

Theme measurement tool 126 then compares the ranked theme subjects to a list of reputable domain-specific theme corpus, to generate representative theme names. Theme measurement tool 126 starts naming with the highest ranked theme subject and sees whether it is present in the reputable financial themes corpus and if there is a match, then this theme subject is used to label the theme itself, otherwise it continues down the rank until it finds a match and if there is not match, it labels the theme with its highest ranked theme subject.

Theme measurement tool 126 then outputs underlying domain-specific themes across the collected articles for the user's search terms, with representative names for each theme and distinct theme subjects.

With reference to FIGS. 2 and 3A, in an example scenario, the search term "currencies" is received as input which results in the list of content items 2 in FIG. 3A. FIG. 3B shows the corresponding output of finance themes after the domain-specific NLP process.

In some embodiments, a news crawler performs a search for new articles with desired search terms, stores the found articles in a database, processes stored articles into an object suitable for further data analysis. In some embodiments, its crawling functionality can be generally compared to a "web crawler", which is a program or automated script that browses the World Wide Web in a methodical, automated manner.

In some embodiments, NLP engine analyses news articles by its Text Analysis, Domain-Specific LDA, and Theme Selection & Naming functionalities, and it produces underlying finance themes of news articles.

In some embodiments, text analysis includes processing text from articles into a consumable format for data analysis. It analyses and filters article content for a following algorithm for finding underlying finance themes.

In some embodiments, Domain-Specific LDA finds underlying finance themes across vast content items.

In some embodiments, theme selection & naming includes selecting only significant themes from found underlying finance themes, and labels the significant underlying finance themes.

In some embodiments, underlying finance themes include a topic related to finance that is present in written article. In some situations, it may be hard to identify common underlying themes shared across many news articles. Aspects of the present application may provide a machine learning mechanism to find them.

In some embodiments, a search term can include a word or combination of words or characters entered into a search engine and/or the web crawler, in order to specify a particular thing to be searched for over news articles.

In some embodiments, a corpus is defined by a collection of written articles.

In some embodiments, a theme can represent a topic included in a content item.

In some embodiments, a theme corpus includes a list of distinct themes found across content items. In some embodiments, it contains different themes brought together as a collection. Each theme in a theme corpus can be represented by its theme subjects. In some embodiments, each theme has usually many theme subjects present.

In some embodiments, a theme subject includes relevant subject matter discussed across articles. In some embodiments, it is represented as keyword. In some embodiments, it forms distinct theme in which are usually many theme subjects present, but some of its theme subjects could be also found in other themes.

In some embodiments, a dataframe is a data structure, in which data can aligned, for example, in a tabular fashion in rows and columns.

In some embodiments, an article word matrix shows how often words appear in each article text. In some embodiments, it is used as learning/fit data for LDA models, which look at word counts in articles.

With reference to FIG. 2, in an example scenario, at 1, the search terms "currency" and "Canada" are inputted. At 2, a list of URLs are identified. For example, the system can searches the top x (e.g. 30) news articles for each supplied search term on Google News website and identifies URL links of found news articles, which then stores as article URL links in memory as string object items of one list object. In some instances, this obtains content items relevant to a user.

At 3, The system collects titles and texts of news articles from their URL links with a news extractor. At 4, the system stores content for content item in an "articles" table 600 (FIG. 6). It stores article title, text, and link along with its user's search terms for each of collected news article in this table. Content can be stored in its separate columns as string values, with primary key on ID (each row entry) and unique index on article title and link.

Figure 6A:
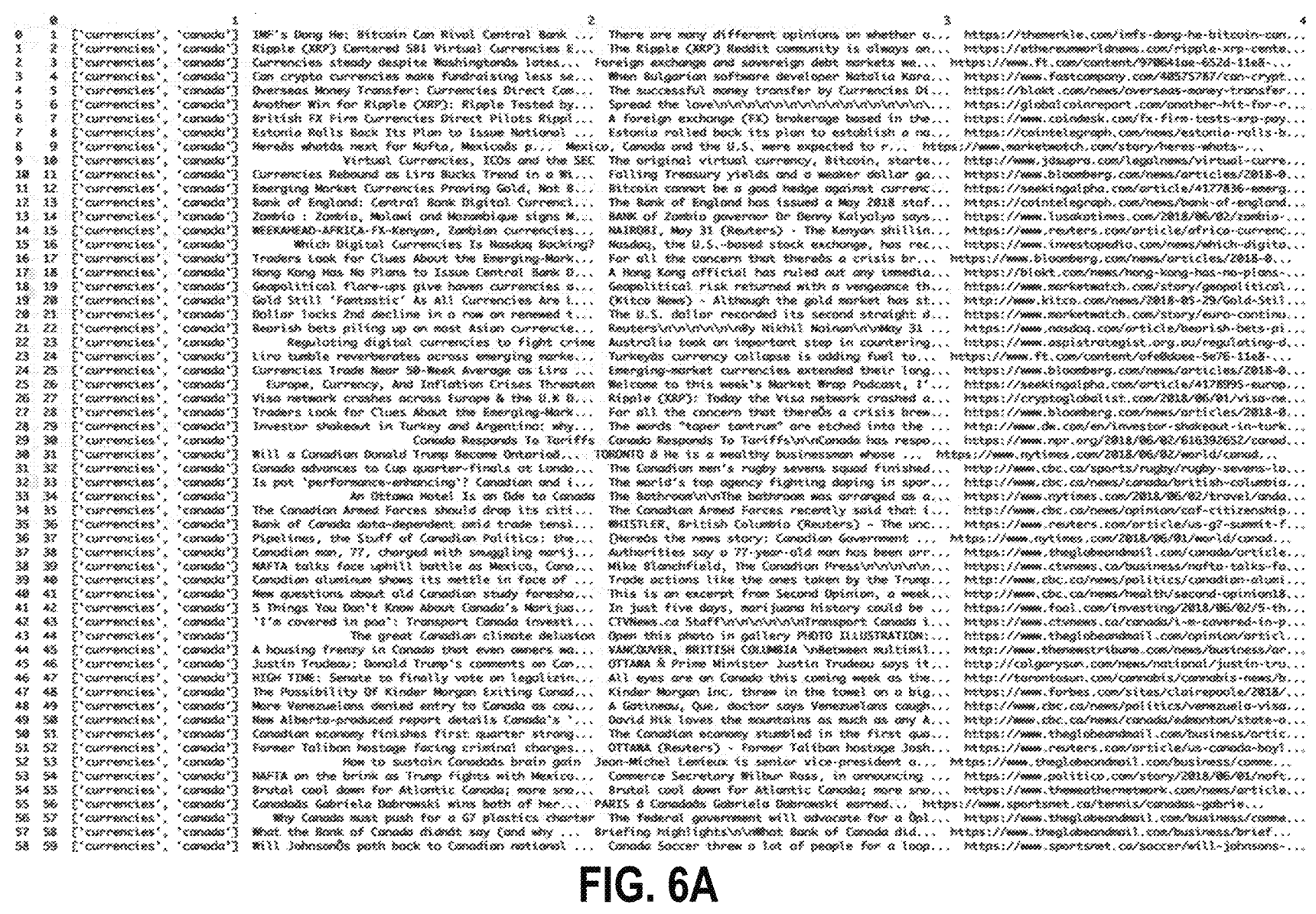

At 5, the system (e.g. web crawler) fetches the collected news articles from database and processes them into an in-memory DataFrame object for further data analysis (FIG. 6A). At 6, the system takes an article text from the retrieved news articles, removes irrelevant footers from each article text, and splits each article text into its individual words. The system removes any information at the bottom of the article text that contains 'disclaimer' or 'disclosure' words. Then, it converts each article text into its word tokens. It does such conversion by first converting the article text to sentence tokens via a sentence tokenizer, and then by converting text from such sentence tokens into word tokens via a word tokenizer.

At 7, the system takes the individual words of each article text and removes stopwords from them & then it forms an article text from such words (see FIG. 7). At 8, the system loads the article title and filtered article text of every article & vectorize such data by composing a matrix of article words from article texts (see FIG. 7A). This matrix shows how often words appear in each article text. At 9, the system feeds an article word matrix, which is representing vectorized article text features, into an 'Domain-Specific LDA' algorithm to start identifying the underlying finance themes.

At 10, the system runs a Latent Dirichlet Allocation (LDA) model on the article text of supplied news articles, which finds the underlying themes across all the news articles, and produces a theme corpus (se. FIG. 8).

At 11, the system evaluates the generated theme corpus for only finance-related themes. It checks every theme for its theme subjects, and it sends all themes back for another themes generation if any theme has no finance-related theme subjects contained in it (See FIG. 9). In detail, it includes the following steps: it checks the top 10 theme subjects produced by LDA against our made 'finance keywords list', and if any theme had no match against our finance keywords list, we send the all article texts back for new theme generation. This process continues until every theme in the generated theme corpus contain finance-related theme subjects (convergence) or until 10 iterations has been reached (forced convergence).

In some situations, this may align very general themes produced by LDA to an domain specific application (e.g. investment world that is heavily involved around finance). The system can, in some embodiments, evaluates themes for domain-specific purpose.

In some embodiments, the system can allow for articles from other non-finance fields, such as sports or crime news, to be targeted and removed.

At 12, the system takes received themes that have no finance-related theme subjects and finds its top articles. The top article of particular theme is the one that is the most dominant in one particular theme. Then, it has two following options whether it finds dominant articles within themes.

a. If system finds dominant articles within one non-finance theme at least, it proceeds to next step of selective data feed (11.*b*).

b. If the system does not find any dominant articles within any non-finance theme, it removes the non-finance themes, and proceed to back to previous step of theme evaluation (11).

For each article, the system find themes where it is the most dominant by transforming the LDA matrix according to the learned (fitted) model with the "document word matrix". The system generates an article theme distribution from such transformation. Then, such distribution is searched to find the highest distribution of each article in a particular theme.

The system considers the most dominant articles within themes so as to not remove articles for a theme if those articles are actually more important in other themes. This may negatively effect theme generation.

There can be a case when a theme has no dominant articles. For such case, there would be no article to remove. Therefore, the system removes the whole theme since this theme is not finance related and has no dominant articles. Then, the system proceeds to previous step 10 of theme evaluation since underlying finance themes has been found at this point without a need of removing articles and running the theme generation again. (See FIG. 10).

At 11.*b*, the system removes dominant articles of non-finance themes from the previously fed dataset & feeds this dataset at once into its NLP algorithm for finding underlying finance themes. The system updates previously supplied dataset by removing such dominant articles from it & feeds it to LDA algorithm.

At 12, the system receives underlying themes that passed the evaluation and therefore are all finance related. The system receives underlying finance themes and proceeds to inspection of theme subjects (see FIGS. 11 and 12).

At 13, the system receives underlying finance themes and inspects each theme subject across all themes. The system calculates the relevance scores for every them subject received underlying finance themes. It calculates the Term Frequency-Inverse Document Frequency (TFIDF) scores & also gets the LDA distribution for each subject theme.

In some situations, the system makes a distinction between themes that contain lot of theme subjects that are distinct, i.e. has positive TFIDF score, and ones that do not have any TFIDF theme subjects, i.e. TFIDF score is zero. Also the system may be configured to determine how each token (theme subject) is important to its theme, so it obtains get the LDA distribution for each theme subject to identify the most dominant themes. Therefore, the system can rank how important is each theme subject to its news article across all collected articles in dataset so it can better decide in the next step on importance of each theme.

At 14, the system receives relevance scores for every theme subjects in every theme, removes underlying finance themes that are insignificant in comparison to other themes, and organize them by their topic distribution. The system eliminates every theme in underlying finance themes that has no theme subject with positive TFIDF score, and order themes by amount of their theme subjects (tokens) compared to all theme subjects across articles via LDA own distribution for theme subjects. In some situations, this evaluates the importance of each theme and eliminate those themes that are better already represented by other stronger themes within a theme corpus. See FIG. 13.

At 15, the system takes ranked theme subjects and compares them to the list of reputable financial theme corpus, so as to generate representative theme names. The system starts naming with the highest ranked theme subject and sees whether it is present in the reputable financial themes corpus & if there is a match, then this theme subject is used to label the theme itself, else it continues down the rank until it finds a match & if there is not match, it labels the theme with its highest ranked theme subject. See FIGS. 14 and 15.

At 16, the system outputs found underlying finance themes across the collected articles for user's search terms. The system produces underlying finance themes with representative names for each themes and distinct theme subjects. See FIG. 16.

Figure 4:
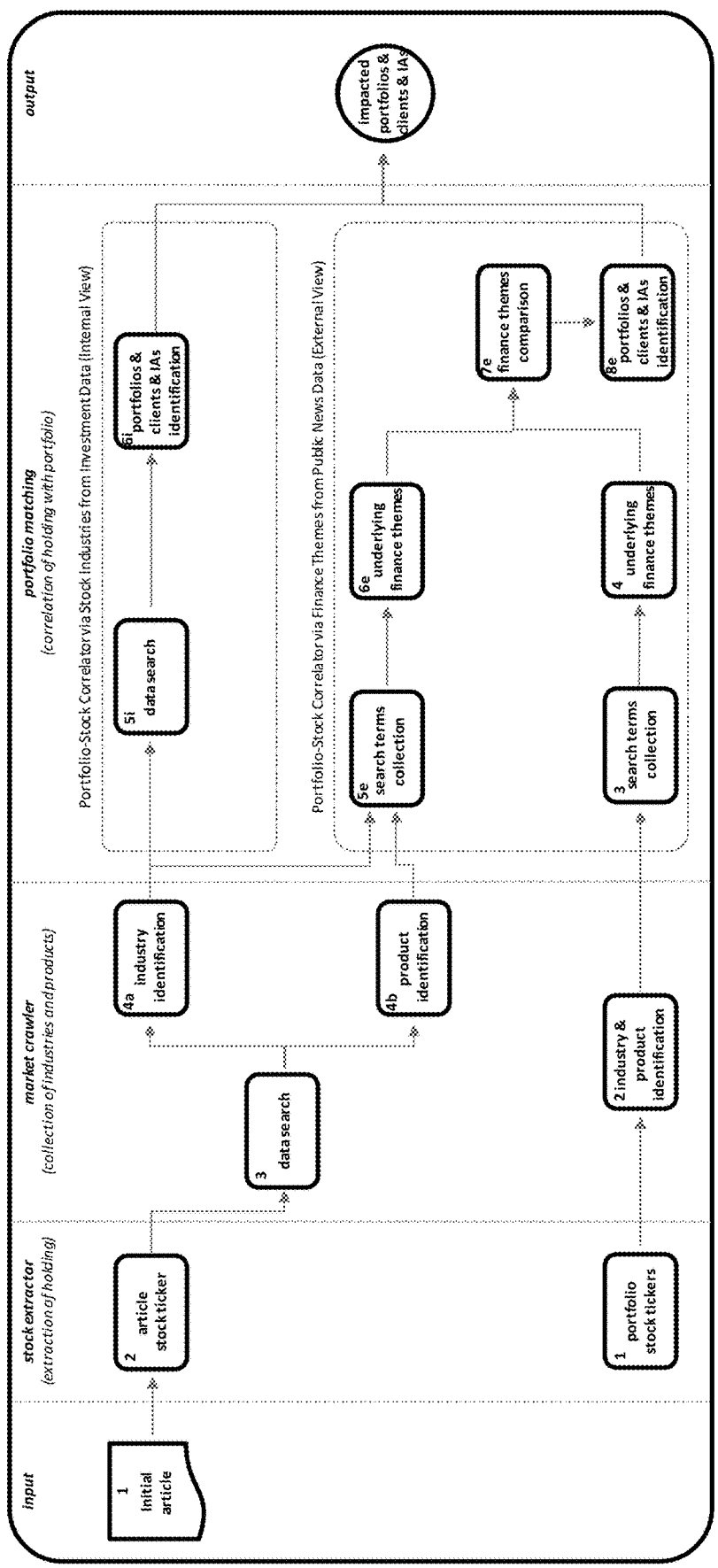
FIG. 4 is schematic diagram showing aspects of another example data flow according to some embodiments.

FIG. 4 is schematic diagram for two applications of a text analytics platform according to some embodiments.

Companies can publish internal articles with recommendations. In the financial sector these articles may have outlooks to investment advisors about security, for example. Articles often contain critical actions to be timely taken on specific holdings. However, articles are distributed in bulk to all investment advisors, who might be overwhelmed with a lot of internal and external documents, and some may miss such important recommendations. It can be may be time consuming and challenging for an investment advisor to quickly understand the possible coverage or impact that an internal article has, particularly if speed to execute is important. The platform 100 can provide an automated and enhanced system to fully relate coverage or impact of articles on the markets to holdings to help identify those clients or documents for investment advisors. The platform 100 can identify impacted clients' portfolios and their investment advisors.

In an example application, there can be an internal article, for example, a domain-specific article written for a particular entity. In this example, the article contains a recommendation about specific clients' holdings from equity market. The internal article can be input into the platform 100 to find the impacted clients' portfolios. In some embodiments the article may be automatically provided to platform 100 after creation.

In the example application, platform 100, uses stock extractor 440 to extract the stock ticker where the document or article has recommended a specific action. Market crawler 442 searches for additional market information about the found stock ticker in a database 112, 170, for example an internal financial database. In some embodiments, platform 100 may search for company names, industries, and products that are associated with the found ticker.

Market crawler 442 can get industry identification of a stock ticker from a previous data search and can extract an industry sector, group and subgroup fields from financial data for the stock ticker, its parent company (if any) and for its subsidiaries or affiliates (if any).

Market crawler 442 can also get products related to the company of the stock ticker from the previous data search. Market crawler 442 can extract products from financial data for the company and its parent company (if any) and for its subsidiaries (if any).

Platform 100 provides the industry identification information to portfolio matching tool 128 for analysis with respect to internal data. Portfolio matching tool 444 searches internal databases with current clients' holdings to find all related holdings to this stock ticker by searching for the stock ticker, its previously found industries as well as previously found parent and subsidiary company industries. Portfolio matching tool 444 then identifies portfolios, clients and investment advisors that are related to this stock ticker from the internal article.

In addition, platform 100 provides the products identification information, as well as industry identification to portfolio matching tool 44 for analysis with respect to public news articles. Portfolio matching tool 128 assembles industry and product information into a collection of search terms for provision to crawler 180. Using articles found by crawler 180, platform 100 uses natural language processor 120 to find underlying finance themes across news articles. Portfolio matching tool 444 then compares all theme subjects found from underlying finance themes of article stock ticker to all theme subjects from found underlying finance themes of every client portfolio. Portfolio matching tool 444 compares theme subjects between underlying finance themes for an article and underlying finance themes of a particular portfolio. Portfolio matching tool 444 identifies clients and investment advisors that are related to the found finance themes to this stock ticker from the internal article. For example, portfolio matching tool 444 may consider portfolios with a match of theme subjects over 30% (comparing top 50 theme subjects of every theme).

Figure 5:
FIG. 5 shows example screenshots of results outputted on a display associated with a user account according to some embodiments.

Platform 100 outputs the clients, investment advisors, and portfolios that were impacted by specific recommendations in the interface application 130 which can include an article with both an internal and external view. In some embodiments platform 100 shows statistics of impacted clients, investment advisors and portfolios as percentages, market values and as a complete list (see FIG. 5 for example).

In another example application, stock extractor 440 extracts the stock tickers for every client portfolio from an internal database of client holdings. Market crawler 442 can compute industry and product identification tickers for every client portfolio. Portfolio matching tool 444 composes a list of search terms for every client portfolio. The search terms are provided news crawler 180. Using articles found by news crawler 180, platform 100 uses natural language processor 120 to find underlying finance themes across news articles. Portfolio matching tool 444 then compares all theme subjects found from underlying finance themes of article stock ticker to all theme subjects from found underlying finance themes of every client portfolio. Portfolio matching tool 444 compares theme subjects between underlying finance themes for an article and underlying finance themes of a particular portfolio. Portfolio matching tool 444 identifies clients and investment advisors that are related to the found finance themes to this stock ticker from the internal article. For example, portfolio matching tool 444 may consider portfolios with a match of theme subjects over 30% (comparing top 50 theme subjects of every theme).

Platform 100 outputs the clients, investment advisors, and portfolios that were impacted by specific recommendations in an internal article from both an internal and external view. In some embodiments platform 100 shows statistics of impacted clients, investment advisors and portfolios as percentages, market values and as a complete list (see FIG. 5 for example).

In some embodiments, the platform can generate communications or alerts for communicating to devices or accounts associated with impacted clients, investment advisors, etc.

In some embodiments, a portfolio-based text analytics platform comprises a processor and a memory storing machine executable instructions to configure the processor to: process text data corpus from articles using a natural language processor to generate themes; generate visual elements for an interface application that represent the themes; trigger the display of the visual elements on the interface application at a display, the visual elements having interactive indicia for selection to dynamically update the visual elements and select one or more themes to generate additional visual elements corresponding to the selected one or more themes.

In some embodiments, the processor is configured to collect the articles using a crawler and store the articles in a data storage device.

In some embodiments, the crawler receives a set of search terms and collects the articles using the search terms.

In some embodiments, the processor is configured to store the search terms as string object items of a list for provision to the crawler.

In some embodiments, the processor is configured to use the natural language processor to rank the themes in relation to a field.

In some embodiments, the processor is configured to use the natural language processor to convert each of the articles into an article word matrix of word tokens and corresponding frequencies.

In some embodiments, the processor is configured with a Latent Dirichlet Allocation (LDA) model to generate a theme corpus for the themes for use by the natural language processor, the theme corpus being a list of distinct themes across the articles.

In some embodiments, the natural language processor evaluates each of the themes for domain related themes.

In some embodiments, the processor is configured to generate a relevance score for each of the themes.

In some embodiments, each of the themes is linked to multiple theme subjects.

In some embodiments, the themes are finance themes.

In some embodiments, the processor configures a text analysis tool to tokenize text from the articles, remove irrelevant words, and create a matrix of token counts for the natural language processor.

In some embodiments, the processor configures a domain-specific LDA to generate underlying themes from the articles, compare the themes to a keyword list and iteratively eliminate a portion of articles or themes to produce a list of domain-specific themes for the natural language processor.

In some embodiments, the processor configures the theme measurement tool to, for each of the themes, compute a term-frequency-inverse document frequency score, eliminate themes having no theme subjects with positive term-frequency-inverse document frequency scores, rank themes based on the amount of theme subjects compared to all theme subjects across articles using distributions for theme subjects, and name each of the themes by comparing the highest rank theme subject to established theme names.

In some embodiments, the processor configures a crawler to collect text and titles of the articles and save it in a table with a unique identifier for each article in a data storage device.

In some embodiments, the portfolio-based text analytics platform comprises a portfolio matching tool to identify one or more portfolios using the themes.

In some embodiments, the processor configures the portfolio matching tool to identify client portfolios affected by a stock ticker recommendation.

The discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

What is claimed is:

1. A computer-implemented system for natural language processing, the system comprising:
   at least one memory and at least one processor configured to provide a domain-specific natural language processing engine, the domain-specific natural language processing engine configured for:
   obtaining a content item matrix including word data from a plurality of content items;
   with a natural language processing topic model, generating from the content item word matrix a corpus of themes and a plurality of theme tokens associated with each theme in the corpus of themes;
   when each of the plurality of theme tokens associated with a first theme in the corpus of themes fails to match any of a plurality of domain-specific keywords:
   modifying the content item matrix to remove word data for at least one dominant content item for the first theme; and
   regenerating from the modified content item word matrix the corpus of themes and the plurality of theme tokens associated with each theme in the regenerated corpus of themes with the natural language processing topic model;
   ranking themes from the regenerated corpus of themes based on relative distributions of the theme tokens of the respective themes in the regenerated corpus of themes;
   generating domain-specific output text for one or more of the ranked themes; and
   generating signals for communicating the domain-specific output text.

2. The system of claim 1, wherein the natural language processing topic model is a latent Dirichlet allocation model.

3. The system of claim 1, wherein the domain-specific natural language processing engine is configured for: when each of the plurality of theme tokens associated with a second theme of the corpus of themes fails to match any of a plurality of domain-specific keywords, and when the second theme does not have any dominant content items, removing the second theme from the corpus of themes.

4. The system of claim 1, wherein the domain-specific natural language processing engine is configured for:
   filtering themes from the regenerated corpus of themes based on importance metrics for the plurality of theme tokens associated with each theme in the regenerated corpus of themes.

5. The system of claim 4, wherein the importance metrics are based on a term frequency-inverse document frequency score.

6. The system of claim 1, wherein generating the domain-specific output text includes mapping the ranked themes to one or more values in a domain-specific theme corpus.

7. The system of claim 1, wherein the at least one processor is configured for:
   obtaining a plurality of results for an input query to identify a plurality of content items; and
   extracting the word data from the plurality of content items.

8. The system of claim 1, wherein the at least one processor is configured for:
   generating signals for displaying the domain-specific output text; and
   upon receiving an input representing a selection of at least a portion of the domain-specific output text, traversing the ranked themes corresponding to the portion of the domain-specific output text and the content item matrix to identify and display information associated with content items corresponding to the selection.

9. The system of claim 1, wherein the at least one processor is configured for:
   mapping the domain-specific output text with at least one symbol stored in association with one or more user accounts; and
   generating signals for communicating data relating to the domain-specific output text to the one or more user accounts associated with the at least one mapped symbol.

10. A method for natural language processing, the method comprising:
    obtaining a content item matrix including word data from a plurality of content items;
    with a natural language processing topic model, generating from the content item word matrix a corpus of themes and a plurality of theme tokens associated with each theme in the corpus of themes;
    when each of the plurality of theme tokens associated with a first theme in the corpus of themes fails to match any of a plurality of domain-specific keywords:

modifying the content item matrix to remove word data for at least one dominant content item for the first theme; and regenerating from the modified content item word matrix the corpus of themes and the plurality of theme tokens associated with each theme in the regenerated corpus of themes with the natural language processing topic model;

ranking themes from the regenerated corpus of themes based on relative distributions of the theme tokens of the respective themes in the regenerated corpus of themes;

generating domain-specific output text for one or more of the ranked themes; and generating signals for communicating the domain-specific output text.

11. The method of claim 10, wherein the natural language processing topic model is a latent Dirichlet allocation model.

12. The method of claim 10, comprising: when each of the plurality of theme tokens associated with a second theme of the corpus of themes fails to match any of a plurality of domain-specific keywords, and when the second theme does not have any dominant content items, removing the second theme from the corpus of themes.

13. The method of claim 10, comprising:
filtering themes from the regenerated corpus of themes based on importance metrics for the plurality of theme tokens associated with each theme in the regenerated corpus of themes.

14. The method of claim 13, wherein the importance metrics are based on a term frequency-inverse document frequency score.

15. The method of claim 10, wherein generating the domain-specific output text includes mapping the ranked themes to one or more values in a domain-specific theme corpus.

16. The method of claim 10, comprising: obtaining a plurality of results for an input query to identify a plurality of content items; and
extracting the word data from the plurality of content items.

17. The method of claim 10, comprising:
generating signals for displaying the domain-specific output text; and upon receiving an input representing a selection of at least a portion of the domain-specific output text, traversing the ranked themes corresponding to the portion of the domain-specific output text and the content item matrix to identify and display information associated with content items corresponding to the selection.

18. The method of claim 10, comprising:
mapping the domain-specific output text with at least one symbol stored in association with one or more user accounts; and
generating signals for communicating data relating to the domain-specific output text to the one or more user accounts associated with the at least one mapped symbol.

19. A non-transitory, computer-readable medium or media having stored thereon computer executable instructions which when executed configure at least one processor for:
obtaining a content item matrix including word data from a plurality of content items;
with a natural language processing topic model, generating from the content item word matrix a corpus of themes and a plurality of theme tokens associated with each theme in the corpus of themes;
when each of the plurality of theme tokens associated with a first theme in the corpus of themes fails to match any of a plurality of domain-specific keywords:
modifying the content item matrix to remove word data for at least one dominant content item for the first theme; and
regenerating from the modified content item word matrix the corpus of themes and the plurality of theme tokens associated with each theme in the regenerated corpus of themes with the natural language processing topic model;
ranking themes from the regenerated corpus of themes based on relative distributions of the theme tokens of the respective themes in the regenerated corpus of themes;
generating domain-specific output text for one or more of the ranked themes; and
generating signals for communicating the domain-specific output text.

* * * * *